(12) United States Patent
Subramanian et al.

(10) Patent No.: US 8,301,189 B1
(45) Date of Patent: Oct. 30, 2012

(54) METHOD AND APPARATUS FOR REDUCING POWER CONSUMPTION IN A MULTIMODE TERMINAL WHEN PERFORMING IP COMMUNICATIONS

(75) Inventors: Mahesh Subramanian, Bangalore (IN); Steven D. Gray, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 806 days.

(21) Appl. No.: 12/018,163

(22) Filed: Jan. 22, 2008

Related U.S. Application Data

(60) Provisional application No. 60/886,166, filed on Jan. 23, 2007.

(51) Int. Cl.
*H04M 1/00* (2006.01)
(52) U.S. Cl. ..................................... 455/552.1; 455/574
(58) Field of Classification Search ............... 455/426.1, 455/550.1, 551, 552.1, 553.1, 574, 127.5, 455/343.1
See application file for complete search history.

(56) References Cited

U.S. PATENT DOCUMENTS

| | | | | |
|---|---|---|---|---|
| 5,058,203 | A * | 10/1991 | Inagami | 455/574 |
| 7,590,432 | B2 * | 9/2009 | Behzad et al. | 455/574 |
| 2004/0185899 | A1 * | 9/2004 | Hayem et al. | 455/552.1 |
| 2005/0286466 | A1 * | 12/2005 | Tagg et al. | 370/329 |
| 2006/0068837 | A1 * | 3/2006 | Malone | 455/552.1 |
| 2006/0234762 | A1 * | 10/2006 | Ozluturk | 455/552.1 |

* cited by examiner

*Primary Examiner* — Ping Hsieh

(57) ABSTRACT

An apparatus for reducing power consumption in an IP (Internet Protocol) communications device. The apparatus may include a high-power consumption main application processor and a low-power consumption application processor to share processor functions. The high-power consumption application processor may carry out functions related to the user interface of the device, signaling and control path. The low-power consumption application processor may implement IP processing, voice signal processing and video signal processing.

17 Claims, 3 Drawing Sheets

METHOD AND APPARATUS FOR REDUCING POWER CONSUMPTION IN A MULTIMODE TERMINAL WHEN PERFORMING IP COMMUNICATIONS

CROSS REFERENCE TO RELATED APPLICATION

This application claims the benefit of priority to previously filed U.S. provisional patent application Ser. No. 60/886,166, filed Jan. 23, 2007, entitled METHOD AND APPARATUS FOR REDUCING POWER CONSUMPTION IN A MULTIMODE TERMINAL WHEN PERFORMING IP COMMUNICATIONS. That provisional application is hereby incorporated by reference in its entirety.

BACKGROUND

1. Field of the Invention

The present invention relates generally to power management, and more particularly to a method of reducing power consumption in a portable IP (Internet Protocol) communications device, e.g., a multimode device such as a cellular telephone with Internet communication capabilities.

2. Description of Related Art

Continued advancements in telecommunication technologies and Internet technologies have made portable devices with IP capabilities, including cellular telephones with Internet access, very popular. Since talk time and standby time are important performance attributes of such devices, techniques for extending battery life or otherwise reducing power consumption are becoming increasingly important.

FIG. 1 illustrates an exemplary architecture 100 of an existing dual mode cellular/Wi-Fi phone chipset. As shown, the architecture 100 may have an application processor (AP) 101, a Wi-Fi chipset 102 and a cellular modem 103. The application processor 101, which may be an ARM processor, for example, typically may run at frequencies as high as 400-600 MHz, and is a high performance and high-power consumption device. The more the processor 101 is on, the more battery power the processor 101 will drain. The Wi-Fi chipset 102 may communicate with the application processor 101 via an SDIO (Secure Digital Input/Output) interface 104, and the cellular modem 103 may communicate with the application processor 101 via a UART (Universal Asynchronous Receiver/Transmitter) interface 105. The architecture 100 may also include a RAM (Random Access Memory) 106, a DMA (Direct Memory Access) 107, and a bus 108 coupling various components in the architecture 100. The whole IP stack may reside in the application processor 101, which may control all Wi-Fi operation, including link maintenance and message broadcasting. VoIP (Voice over Internet Protocol) is controlled by the application processor 101 as well.

One problem with the architecture 100 shown in FIG. 1 is that the application processor 101, running at relatively high frequencies, may have to be running at full power constantly because of the various functions the application processor 101 performs, thereby resulting in shorter battery life. Even though, for example, processing telephone communications through cellular modem 103 does not require constant activity (for example, in some known implementations, communication is on for a short period of time, such as 20 ms, and then off for a comparable period of time), the application processor 101 may have to be awake during the whole call because of processing of data from Wi-Fi chipset 102. Thus, even when no data is being communicated through the cellular modem 103, the Wi-Fi chipset 102 may be involved in handling and maintaining a status of various network level protocols, e.g., TCP (Transmission Control Protocol), IPv4, IPv6 and UDP (User Datagram Protocol). The architecture 100 of FIG. 1 may have to keep the application processor 101 awake to implement such network protocols. For example, for the Wi-Fi chipset 102 to operate at peak performance, the application processor 101 may have to control the following operations: 1) scanning the radio environment for available access points; 2) connecting to access points in a Wi-Fi communications network capable of providing the best bandwidth and QoS (Quality of Service); 3) sending "keep alive" packets to the Wi-Fi access points to maintain connectivity; and 4) responding and digesting broadcast messages from the Wi-Fi access points. These operations may require considerable processing time of the application processor 101, and consequently may cause significant battery drain.

BRIEF DESCRIPTION OF THE DRAWING FIGURES

Embodiments of the present invention are described herein with reference to the accompanying drawings, similar reference numbers being used to indicate functionally similar elements.

DETAILED DESCRIPTION

The present invention provides an apparatus and method for reducing power consumption in a multimode portable communications device, e.g., a cellular telephone with Internet capabilities. The apparatus may include a high-power consumption main application processor, such as a processor operating at a relatively high frequency, and a low-power consumption application processor, such as a processor or processor core operating at a lower frequency, to share the functions provided by the processor 101 in FIG. 1. Specifically, the high-power consumption application processor may carry out functions related to the device's user interface, signaling and control path, which may require less processor awake time. At the same time, the low-power consumption application processor may implement IP processing, voice signal processing, and video signal processing, which may require more processor awake time. Consequently, the awake time of the high-power consumption processor may be reduced, and battery life of the multimode communications device may be improved.

Figure 2:
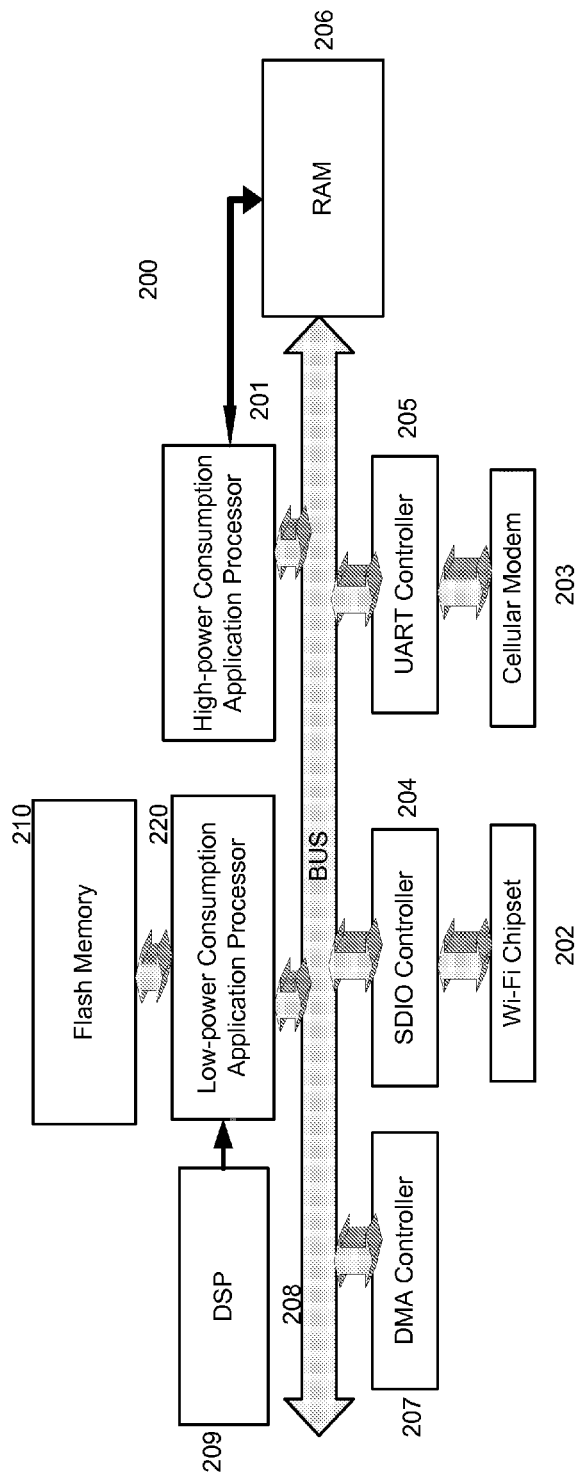
FIG. 2 illustrates an architecture of a chipset for a multimode portable communications device according to one embodiment of the present invention.

FIG. 2 illustrates an architecture 200 of a dual mode cellular/Wi-Fi phone chipset according to one embodiment of the present invention. The architecture 200 may include a high-power consumption main application processor 201, a low-power consumption application processor 220, a Wi-Fi chipset 202 (which may comprise one or more chips) communicating with the processors via an SDIO interface 204, a cellular modem 203 communicating with the processors via a UART interface 205, a RAM 206, a DMA 207, and a bus 208 coupling various components in the architecture 200.

The low-power consumption application processor 220 may implement network level protocols which require a processor to be constantly awake, and may help to reduce demands for the processing time of the main application processor 201. In one embodiment, the low-power consumption application processor 220 may run at 150 MHz, a frequency considerably lower than that of the main application processor 201, which as noted earlier may run at frequencies from 400 to 600 MHz. In general, the particular frequencies are not important; what matters more is the allocation of duties between faster and slower processors. In a multimode device, some functions, such as IP-related functions demanding constant processor attention, may be moved to a low frequency processor. The higher processing capability of the application processor 201 can be reserved for more processor-intensive activities that require faster operation, but less "on" time. As a result, the architecture 200 may be much more power efficient than the architecture 100. In one embodiment, the low-power consumption application processor 220 may be a Low Power ARM Core.

The network level protocols and functions maintained by the low-power consumption application processor 220 may include, e.g., TCP/UDP/IP, RTP (Real-time Transport Protocol)/RTCP (RTP Control Protocol), DHCP (Dynamic Host Configuration Protocol), AJB (Adaptive Jitter Buffering)/PLC (Packet Loss Concealment), IKE (Internet Key Exchange Protocol), including but not limited to IKEv2, AEC (Acoustic Echo Cancellation), and a DNS (Domain Name System) client. For example, the functions carried out by the application processor 101 in FIG. 1 to maintain the performance of the Wi-Fi chipset 202 may now be performed by the low-power consumption application processor 220. In addition, the low-power consumption application processor 220 may also implement voice codecs for VoIP, e.g., G711/G729ab and AMR (Adaptive Multi-Rate).

With the help of the low-power consumption application processor 220 on network level protocols, the main application processor 201 may concentrate on, e.g., the user interface of the device, signaling and control path, and may enter into a sleep mode until the application processor 201 is awakened by user operation or by other components in the architecture 200. The main application processor 201 may control, for example, VoIP, a WLAN (Wireless Local Area Network) client, an IMS (IP Multimedia Subsystem) client, a SIP (Session Initiation Protocol) stack, and video signal sharing.

Figure 1:
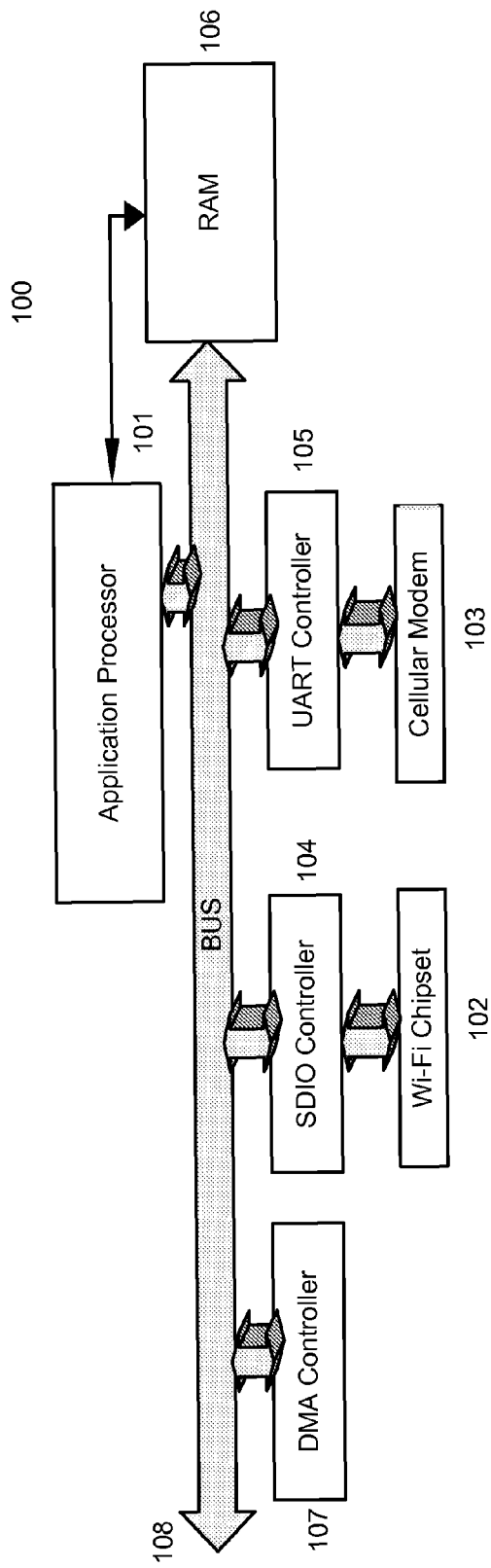
FIG. 1 illustrates an exemplary architecture of an existing chipset for a multimode portable communications device.

In one embodiment, the functions of the application processor 101 in FIG. 1 may be split between the main application processor 201 and the low-power consumption application processor 220 in FIG. 2. The high-power consumption application processor 201 may perform signaling and control path setup. Once the signaling and control path setup are done, the main application processor 201 may send a state machine, as described below, to the low-power consumption application processor 220, and then enter a sleep mode until the application processor 201 is awakened by user operation or by other components in the architecture 200. The low-power consumption application processor 220 may then process the media flow.

Figure 3:
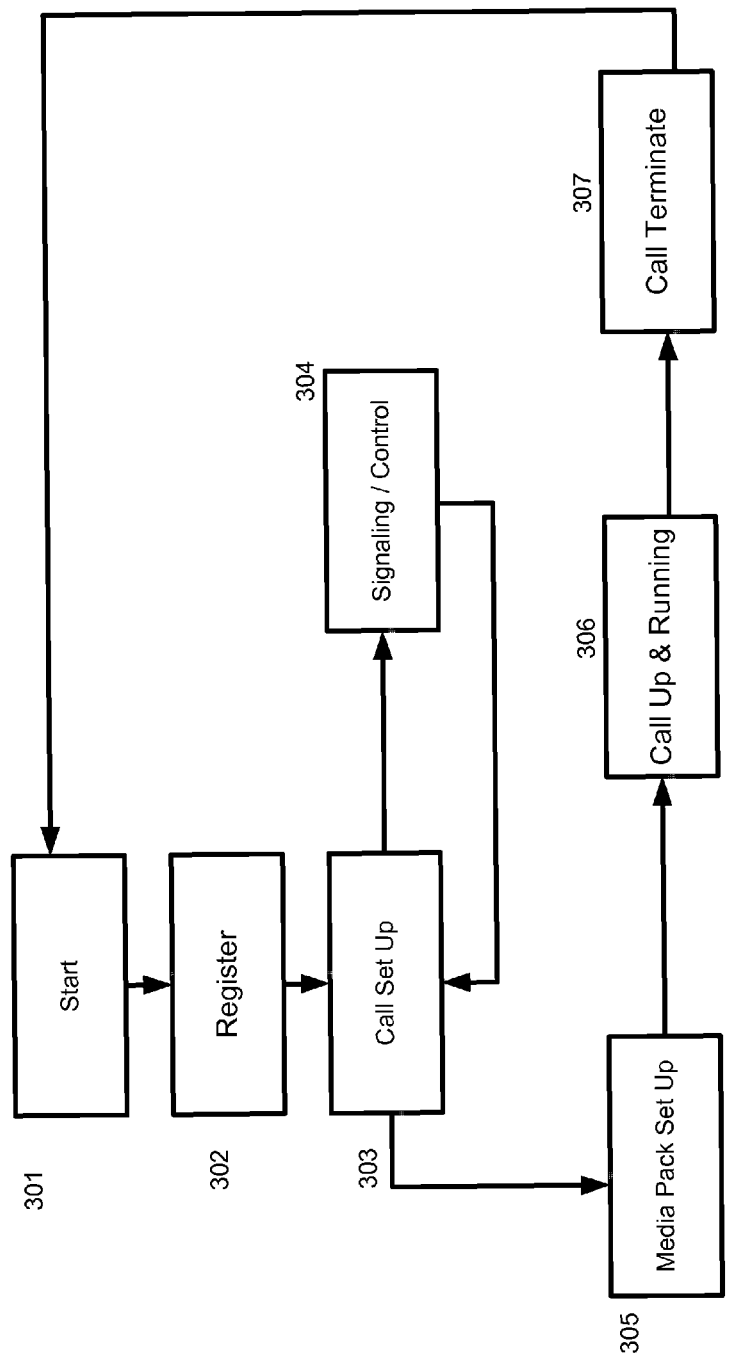
FIG. 3 illustrates a state machine for a call processing procedure which may be exchanged by application processors 201 and 220 in FIG. 2.

FIG. 3 illustrates a state machine for a call processing procedure which may be exchanged by the application processors 201 and 220. As shown, the state machine may include a number of independent states: start 301, register 302, call setup 303, signaling/controlling 304, media pack setup 305, call up & running 306, and call terminate 307. Each state may maintain a set of data in a certain data structure indicating status of the call processing. For example, the state call setup 303 may maintain information about a call, including, e.g., information about the calling party, called party and the type of codec required; the state media pack setup 305 may maintain RTP/RTCP.

In one embodiment, for an incoming call, the main application processor 201 may carry out states 301 to 304, and then may transfer the state machine to the low-power consumption application processor 220. The state machine at this point may indicate that states 301-304 have been completed, a call has been set up, and the main processor 201 is ready to receive media signals. The low-power consumption application processor 220 may receive the state machine, and resume the call processing procedure from the state 305 to pick up a required codec and set up a media pack, according to information about the call maintained at the state 303, call setup. The low-power consumption application processor 220 may continue to state 306, call up and running, to exchange voice and/or video signals between the calling party and called party. When a user hangs up, the low-power consumption application processor 220 may return the state machine to the main application processor 201, with the state machine indicating that states 305 and 306 have been completed. The main application processor 201 may resume the call processing procedure from state 307, call terminate, and then may return to state 301 to wait for another call. Since states 305-306 may be controlled by the low-power consumption application processor 220, the demand for processing time of the main application processor 201 is reduced, and so is the power consumption.

In one embodiment, the low-power consumption application processor 220 may be always up and running, so the main application processor 201 may send a state machine to the low-power consumption application processor 220 anytime the main application processor 201 completes an action. The main application processor 220 can enter a sleep mode when the state machine is sent to the low-power consumption application processor 220. The low-power consumption application processor 220 may wake up the main application processor 201 when it needs to send a state machine to the main application processor 201.

In one embodiment, the low-power consumption application processor 220 may run at a 20 ms sleep/wake cycle. Typical voice communications go through 20 ms cycles: 20 ms data processing and 20 ms silence. The low-power consumption application processor 220 may wake up during the data processing cycle to receive and process voice packets, and then enter into the silence cycle. During the silence cycle, the processor 220 may stop processing the voice packets but continue to maintain network level protocols. The silence cycle, which is a form of sleep-awake cycle but is not what would commonly be termed a "deep" sleep, may help to further extend battery life.

In one embodiment, the low-power consumption application processor 220 may be coupled to a DSP (Digital Signal Processor) (not shown) for video signal processing. In this embodiment, video packets would not go through the main application processor 201. Instead, the packets may be diverted to the DSP via the low-power consumption application processor 220, decoded, and then sent back and displayed on a display of a cellular phone or other multimode device. Power consumption may be reduced, since the main application processor 201 is not involved in video signal processing.

In one embodiment, the low-power consumption application processor 220 may have to handle audio signal processing, video signal processing, and the IP stack. In this embodiment, the application processor 220 may need considerable memory to accomplish these functions. Typically, processors such as processor 220 will not have substantial memory. For example, in one embodiment, a low-power ARM core may include 512 KB of static RAM (SRAM). However, accessing external memory may increase power consumption. Accordingly, in one embodiment, the low-power consumption application processor 220 may use a flash memory 210 to store audio applications, video applications and/or the IP stack. When processing audio signals, the low-power consumption application processor 220 may call up the audio applications stored in the flash memory 210 via intelligent paging. When the audio signal processing is finished, the audio applications may be returned to the flash memory 210. Similarly, the application processor 220 may call up video applications and/or the IP stack when processing relevant signals.

In one embodiment, the IP stack may have seven layers: Application layer 7, Presentation Layer 6, Session Layer 5, Transport Layer 4, Network Layer 3, Data Link Layer 2 and the Physical Layer 1. Instead of placing all layers on the low-power consumption application processor 220, in one embodiment, layer 1 and layer 2 may be moved to the Wi-Fi chipset 202, and layer 7 may be moved to the main application processor 201. Consequently, the Wi-Fi chipset 202 may carry out, e.g., link maintenance and message broadcasting functions, without requesting processing time of the processors 201 and/or 220. In one embodiment, an IP filter (not shown) may be provided at the input of the Wi-Fi chipset 202 to divert signals related to layers 3-6 to the low-power consumption application processor 220, and divert signals related to layer 7 to the main application processor 201. The IP filter may be implemented by software or hardware. Consequently, the demand for the processing time of processors 201 and/or 220 may be reduced, and the power consumption may be reduced as well.

In one embodiment, the display of the multimode communications device may be divided into two parts: one part for constantly changing signals, e.g., signal strength, battery level and call time; and another part for more persistent display functions that do not change. To improve power efficiency, the former may be controlled by the low-power consumption application processor 220, and the latter may be controlled by the main application processor 201.

In one embodiment, the main application processor 201 may maintain connections with a cellular phone network, while the low-power consumption application processor 220 may maintain connections with the Internet and process data from both the Wi-Fi chipset 202 and the cellular modem 203. Since the "on" time of the main application processor 201 may be significantly reduced, the power efficiency of the chipset 200 may be improved.

Although the embodiments are described with reference to a dual mode cellular/Wi-Fi phone chipset, the present invention may be used to handle other functionality as well. One example of such a device is a cell phone with an MP3 or other portable music player, with a low-power consumption application processor for downloading music from the Internet, and a high-power consumption application processor to control operations requiring less processor time, but at a higher processor frequency. Another example is a cellular phone with hardware and software for providing a map service, such as Google Maps™, or a GPS device. In this embodiment, the connection with the website or the server providing the map service or position location is maintained by a low-power consumption application processor, instead of the phone's main application processor operating at a higher frequency.

Several features and aspects of the present invention have been illustrated and described in detail with reference to particular embodiments by way of example only, and not by way of limitation. Alternative implementations and various modifications to the disclosed embodiments are within the scope and contemplation of the present disclosure. Therefore, it is intended that the invention be considered as limited only by the scope of the appended claims.

What is claimed is:

1. An apparatus, comprising:
a first processor configured to i) operate at a first frequency and maintain connections with a wireless telephone network through an interface to the wireless telephone network, ii) operate in an awake mode and a sleep mode, iii) while in the awake mode, set up a telephone call over the wireless telephone network, and set up a control path for the telephone call, and iv) after setting up the telephone call and the control path, enter the sleep mode; and
a second processor coupled to the first processor, the second processor configured to i) operate at a second frequency and implement an Internet related protocol to maintain connections with the Internet through an interface to the Internet while the first processor is in each of the awake mode and the sleep mode, ii) maintain the telephone call over the wireless telephone network after the first processor enters the sleep mode, and iii) after the telephone call is terminated, instruct the first processor to enter the awake mode, wherein the second frequency is lower than the first frequency.

2. The apparatus of claim 1, wherein the second processor is configured to process audio signals from at least one of the wireless telephone network and the Internet.

3. The apparatus of claim 1, wherein the second processor is configured to process video signals from at least one of the wireless telephone network and the Internet.

4. The apparatus of claim 1, further comprising a flash memory configured to store signal processing applications for the second processor.

5. The apparatus of claim 1, wherein in response to the first processor entering the sleep mode, the first processor is configured to remain in the sleep mode until the first processor is awakened.

6. The apparatus of claim 1, wherein:
the first processor and the second processor are configured to exchange a state machine while processing the telephone call; and
the state machine comprises a plurality of independent states that are processed individually by the first processor or the second processor.

7. The apparatus of claim 1, further comprising a DSP (Digital Signal Processor), coupled to the second processor, the DSP configured to process video signals.

8. The apparatus of claim 1, wherein the interface to the wireless telephone network comprises a cellular modem, and the interface to the Internet comprises a Wi-Fi chip.

9. The apparatus of claim 8, wherein the first processor is configured to implement an application layer of the Internet related protocol.

10. The apparatus of claim 9, wherein the Wi-Fi chip is configured to implement at least one of a data link layer and a physical layer of the Internet related protocol.

11. The apparatus of claim 10, further comprising an IP filter configured to respectively divert signals to the first processor, the second processor, and the Wi-Fi chip according to the layers of the Internet related protocol to which the signals belong.

12. The apparatus of claim 11, wherein signals diverted to the second processor comprise audio signals or video signals.

13. The apparatus of claim 1, wherein the Internet related protocol comprises one or more of TCP (Transmission Control Protocol), UDP (User Datagram Protocol), IP (Internet Protocol), RTP (Real-time Transport Protocol)/RTCP (RTP Control Protocol), DHCP (Dynamic Host Configuration Protocol), AJB (Adaptive Jitter Buffering)/PLC (Packet Loss Concealment), IKE (Internet Key Exchange Protocol), AEC (Affinity Entry Consistency), or a DNS (Domain Name System) client.

14. The apparatus of claim 1, wherein the second processor is configured to implement a voice codec for VoIP (Voice over Internet Protocol).

15. The apparatus of claim 1, wherein the second processor is configured to download music from the Internet, control a map service, or control a global positioning system (GPS).

16. An Internet-capable cellular telephone comprising the apparatus of claim 15.

17. An Internet-capable cellular telephone comprising the apparatus of claim 1.

* * * * *